(12) United States Patent
Welker (10) Patent No.: US 7,701,803 B2
(45) Date of Patent: Apr. 20, 2010

(54) UNDERWATER ACOUSTIC POSITIONING METHODS AND SYSTEMS BASED ON MODULATED ACOUSTIC SIGNALS

(75) Inventor: Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 152 days.

(21) Appl. No.: 11/456,101

(22) Filed: Jul. 7, 2006

(65) Prior Publication Data
US 2008/0008032 A1 Jan. 10, 2008

(51) Int. Cl.
G01V 1/38 (2006.01)
(52) U.S. Cl. .............................. 367/17; 367/16; 367/19
(58) Field of Classification Search .................... 367/16, 367/17, 18, 19, 20, 106, 130
See application file for complete search history.

(56) References Cited

U.S. PATENT DOCUMENTS

| 4,033,278 | A | 7/1977 | Waters |
| 5,668,775 | A | 9/1997 | Hatteland |
| 6,932,017 | B1 | 8/2005 | Hillesund et al. |
| 2005/0180263 | A1 | 8/2005 | Lambert et al. |
| 2006/0227658 | A1* | 10/2006 | Toennessen et al. ........... 367/18 |

FOREIGN PATENT DOCUMENTS

WO WO 2005096018 A1 10/2005

OTHER PUBLICATIONS

Dowling, "The dynamics of towed flexible cylinders Part I, Neutrally bouyant elements," *J. Fluid Mech.*, 187:507-532, 1988.
Dowling, "The dynamics of towed flexible cylinders Part II. Negatively bouyant elements," *J. Fluid Mech.*, 187:533-571, 1988.
Tritton, Physical Fluid Dynamics, 2nd Ed., Oxford University Press, Ch. 13, pp. 153-161, 1988.
International Search Report, dated Mar. 5, 2008, for PCT Application No. PCT/US2007/072268.

* cited by examiner

*Primary Examiner*—Ian J Lobo (57) ABSTRACT

Methods and systems for moving seismic streamer steering devices to target positions are disclosed. One method comprises calculating forces required to steer one or more seismic streamer steering devices in a seismic spread to target positions, the calculated forces based wholly or in part on information in modulated underwater acoustic transmissions, and steering the streamer steering devices to the target positions using the calculated forces. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

20 Claims, 4 Drawing Sheets

UNDERWATER ACOUSTIC POSITIONING METHODS AND SYSTEMS BASED ON MODULATED ACOUSTIC SIGNALS

BACKGROUND OF THE INVENTION

1. Field of Invention

The present invention relates to the field of marine seismic data acquisition systems and methods of using same. More specifically, the invention relates to systems and methods for positioning of streamer steering devices attached to or integral with marine streamer cables using modulated underwater acoustics.

2. Related Art

Marine seismic exploration investigates and maps the structure and character of subsurface geological formations underlying a body of water. For large survey areas, a towed seismic survey spread may have vessels towing multiple seismic streamer cables through the water, and one or more seismic sources by the same or different vessel. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Streamers are typically positioned with acoustic ranging devices attached to or integrated into the streamers. The performance of the acoustic ranging devices varies throughout the spread for a variety of reasons. These hindrances to acoustic propagation include bubbles in the water column generated by the seismic source, density layering in the water column causing refraction and reflection of the acoustic energy, and interference from bottom reflected signals. In an attempt to deal with the degraded acoustic performance due to these factors, the individual distance measurements are often filtered before the distances are introduced to the position estimation algorithms. However, in some cases the degraded acoustic performance is so severe that re-acquisition is required (at great expense) and only possible when the acoustic propagation environment changes to allow it. When adequate relative positions are determined through acoustic ranging and other types of relative positioning measures such as compasses, baseline distances, and inertial positioning units, a link is needed to an earth fixed reference frame. This is typically achieved through the Global Positioning System (GPS) using receivers mounted on buoys or floats attached to the streamers and sources of the seismic spread. These floats are connected at points away from the seismic hydrophones to prevent tugging noise at the hydrophones. The longer the distance along the streamer away from the GPS control points, the greater the degradation of positioning accuracy throughout the spread. The current state of the art is to asymmetrically deploy tail buoys at the front and tail of the spread, with fewer floats at the front due to the towing and handling challenges encountered near the seismic source.

Steering devices along the streamer cause the streamer to deform in a deterministic way. The physics of the deformation have been described elsewhere. Conventional streamer positioning uses compasses and assumes a straight shape. On a streamer using lateral steering devices, such as steerable birds known under the trade designation Q-FIN™, from WesternGeco, the streamer shape is non-straight due to lateral forces exerted by the wings of the steerable birds. Direction measures tangent to the cable will give erroneous position estimates on a steered cable since the conventional straight cable assumption is untrue. In order to address this problem, intrinsic ranging using modulated acoustics was developed (see U.S. Pat. No. 5,668,775) to give a high density of acoustic transmitter and receiver points along the streamer. The points are so close that an arc formed between them is approximately a straight line. However, these acoustic ranging techniques only provide actual distances between acoustic nodes (acoustic transmitters and receivers, or transceivers), and do not provide the spatial relation of objects to the streamer steering devices which would allow the devices to make individual decisions as to how to steer the streamer in an optimal way. Presently, the only way to achieve coordination of streamer steering devices is with communications through the streamers.

U.S. Pat. No. 6,932,017 describes a streamer steering device coordination system, or global controller. The objective of the global controller is to control the streamers in some optimal ways, such as constant separation or feather modes. With knowledge of all relevant points along the streamer, including and especially the steering devices themselves, decisions regarding wing angle to achieve a lateral force on the streamer are made. Further, as described in Published U.S. Application number 20050180263, a method for transmitting coordinates through the water, by-passing a communications system through the streamer, may be used to provide information to streamer control devices.

Alternate methods and systems of coordinating control of streamer steering devices that would not depend on signals transmitted through the streamers would be beneficial. The methods and systems of the present invention address this problem.

SUMMARY OF THE INVENTION

In accordance with the present invention, systems and methods are described for moving seismic streamer steering devices to target positions based in whole or in part on modulated underwater acoustic transmissions. The systems and methods of the invention reduce or overcome problems with previous systems and methods. Systems and methods of the invention may be used to collect marine seismic data, for example 3-D and 4-D marine seismic data. The methods of the invention apply to any type of lateral streamer steering device attached to or inline with a cable and exerting a lateral force at a point along a seismic streamer cable. Methods of streamer steering device control are described that may facilitate achieving an optimum position for all points along a streamer. The streamer steering control methods and systems of the invention use acoustic transmissions through the water to provide coordinates, and thus the spatial relation of objects to one or more streamer steering devices, allowing the streamer steering devices to make individual, local decisions as to how to steer the streamer in an optimal way. Thus the coordination of streamer steering devices may be achieved without communications through the streamer.

A first aspect of the invention comprises methods of calculating forces to be exerted by streamer steering devices, one method comprising:

(a) calculating forces required to steer one or more seismic streamer steering devices in a seismic spread to target positions, the calculated forces based wholly or in part on information in one or more modulated underwater acoustic transmissions; and (b) steering the one or more streamer steering devices to the target positions using the calculated forces.

Methods of the invention include those wherein the marine steering devices are steerable birds having one or more wings, and the calculation of forces comprises calculating force to be exerted by the wings of one or more steerable birds. Optionally, information carried through the steamers (hard wire) or transmitted through non-acoustic wireless transmissions may be used in the calculations, but this is not a requirement of methods and systems of the invention. As used herein the term "information" includes, but is not limited to, modulated information is selected from coordinates of one or more other streamer steering devices, coordinates of a center of a seismic source, water physical properties, water fluid properties, base survey receiver positions, collision avoidance coordinates, angle of wings to a reference, stepper motor settings, controller set points, tension in the streamer, streamer diameter, streamer density, angle of incidence of the streamer to flow direction, streamer relative water speed, streamer diameter, streamer density and any combination of two or more thereof and the like. The water fluid properties may be selected from water current vector at a towing vessel, water current vector at one or more streamer steering devices, and historical water current vectors. The water physical properties may be selected from temperature, salinity, conductivity, resistivity, density, specific gravity, and the like. Target positions for streamer steering devices may be dictated by optimizing shape of the spread to fit a survey objective selected from straight with a desired feather angle, local feather angles defined by segments along the streamer to achieve a best fit for a prior streamer survey shape, and evenly spaced streamers to allow better trace interpolation during seismic data processing. The target positions may be calculated with varying resolution. High resolution may be achieved by providing a plurality of streamer steering devices in one or more streamers, each streamer steering device having its own individual target position and calculated forces to achieve the target positions. Alternatively, at least one of the target positions may have a coordinate occupied by a steering device in a previous survey. At least one of the target positions may be based on moving a portion of the streamer to a location that provides a particular offset, azimuth, or both an offset and azimuth related to a seismic source. Validating at least some of the target positions may be carried out as part of the inventive processes. Other methods of the invention may comprise sensing earth-based position of points on the seismic streamer through use of satellite receivers spaced as desired in the spread, which may be regularly or randomly spaced. The points on the streamer may be streamer steering device locations.

A second aspect of the invention is a system comprising:
(a) a seismic spread comprising one or more seismic streamers comprising one or more one or more seismic streamer steering devices, the spread comprising seismic instruments capable of interpreting modulated underwater acoustic transmissions;
(b) one or more of the streamer steering devices comprising means to calculate forces to drive the seismic steering devices to target positions based in whole or in part on the modulated underwater acoustic transmissions; and
(c) the seismic streamer steering devices comprising actuators capable of exerting the calculated forces.

Systems of the invention include those wherein at least some of the streamer steering devices are steerable birds having wings, and the actuators are stepper motors. Seismic instruments capable of interpreting modulated underwater acoustic transmissions may include acoustic signal modulators, acoustic signal demodulators, band pass filters, amplifiers, and the like. Streamers useful in the invention may comprise sensors such as temperature, pressure, or acoustic seismic sensors, and the seismic sensors may be hydrophones. Other streamer portions may include acoustic positioning receivers, transceivers, depth meters, inertial sensors, satellite signal receivers, salinity sensors, connectors, and the like. A transceiver is a dual functioning unit that both transmits and receives acoustic signals. Systems of the invention may also utilize buoy-mounted acoustic transmitters and/or receivers wherein the buoys are tethered to something other than the streamers, such as a buoy anchored in a channel.

Systems of the invention may include satellite-based global positioning control points (satellite receivers) spaced as desired throughout the spread, either regularly or randomly spaced. The satellite receivers may be stationed on floatation devices, for example buoys, tethered to a streamer. As with acoustic transmitters and receivers, the invention contemplates usage of buoy-mounted satellite receivers in conjunction with one or more streamer mounted satellite receiver, wherein some of the buoys are not attached to any spread element, but anchored to some other location.

Systems of the invention include those systems wherein the seismic streamers may be positioned in over/under arrangement, or offset horizontally. It is not necessary that streamers follow any defined path or trajectory to employ methods and systems of the invention, as long as it is possible to calculate forces for the streamer steering devices to exert based wholly or in part on information carried in modulated underwater acoustic transmissions between spread elements. Systems of the invention may comprise inertial positioning components, in instances when satellite communication is blocked or unavailable. Systems of the invention may include means for communicating positions of the seismic streamers, streamer steering devices, and/or seismic receivers to the vessel or other information repository or controller (such as steering device controllers) requiring the information.

Systems and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

Figure 1:
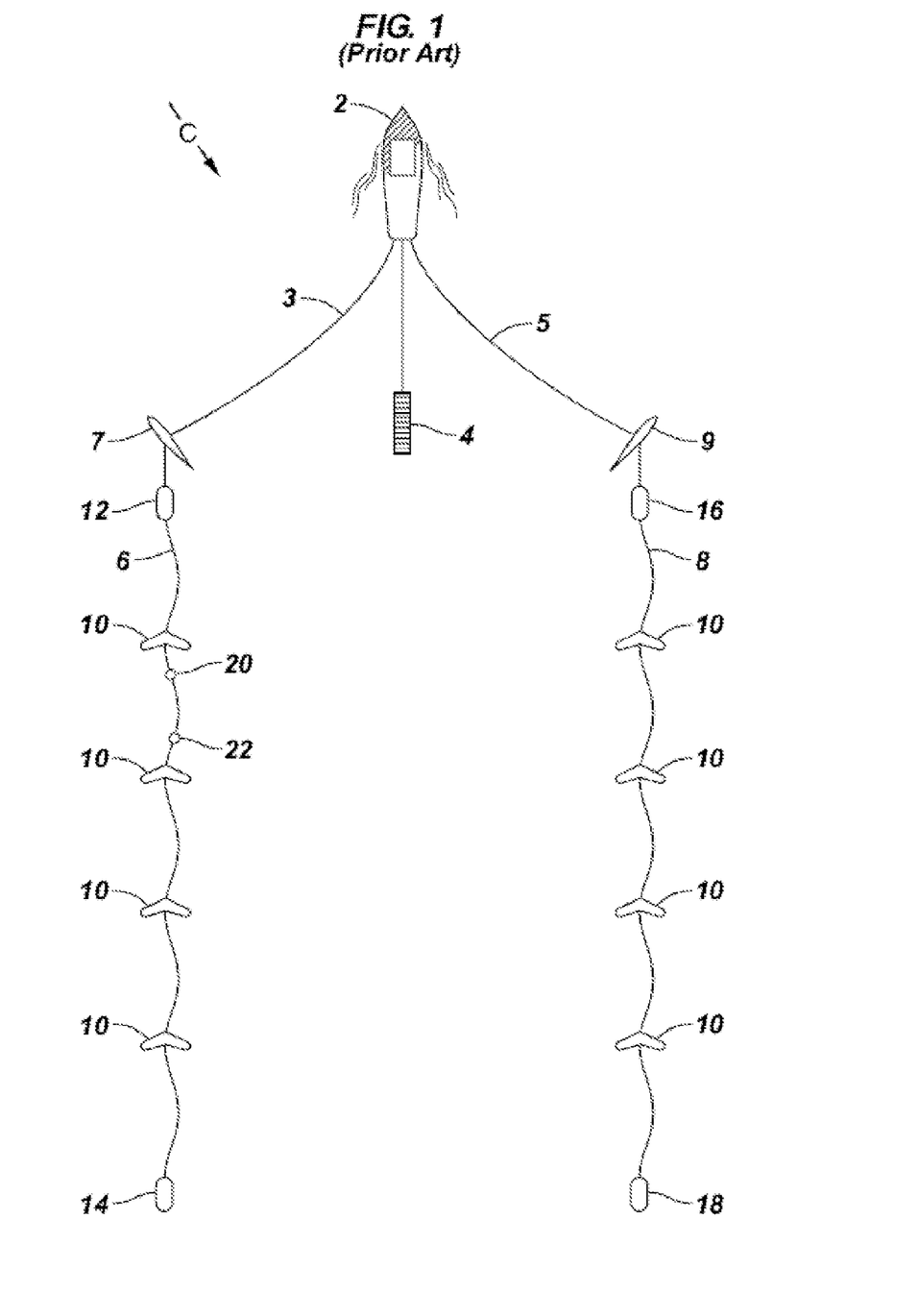
FIG. 1 illustrates a simplified schematic plan view of a towed streamer seismic spread that may benefit from the methods and systems of the invention.

As illustrated schematically in FIG. 1, in order to perform marine seismic surveys, one or more marine seismic streamers 6, 8, each typically several thousand meters long and containing a large number of hydrophones and associated electronic equipment distributed along its length, may be towed at about 2 to 3 m/s behind a seismic survey vessel 2 using tow cables 3 and 5, which also may tow one or more seismic sources 4 comprising source members, typically air guns. Streamers 6 and 8 may be outer-most streamers of a greater number of streamers than depicted in FIG. 1, and then might be diverted by streamer diverters 7 and 9. Acoustic signals produced by seismic sources 4 are directed down through the water into the earth beneath, where they are reflected from the various strata. The reflected signals may be received by numerous acoustic receivers (hydrophones) in the streamers, as indicated at 20, 22, digitized and then transmitted to the seismic survey vessel, where they may be recorded and at least partially processed with the ultimate aim of building up a representation of the earth strata in the area being surveyed. In recent years, seismic streamers have included acoustic ranging systems, wherein acoustic transmitters and receivers (or transducers performing both functions of transmitting and/or receiving) are stationed strategically in the streamers and dedicated to determining position of the streamers. Note that acoustic transducers exist that are dual functioning units, both transmitting and receiving, and these may be used to determine distance between points on one or more seismic streamers and cables. One may speak of acoustic networks (or simply "nets") of transmitters and receivers placed, for example, at the mid-point of the streamers, thus forming a mid-point acoustic net, at the tail of the streamers forming a tail acoustic net, at the front of the streamers forming a front-end acoustic net, and/or quarter points of streamers, forming quarter point acoustic nets, and so on. Finally, if the acoustic positioning transmitters and receivers are placed generally throughout the streamers, one may speak of a so-called full-length acoustic net, which is in effect a single acoustic net. Satellite receivers stationed at the tow vessel and the end of the streamers on buoys 12, 14, 16, and 18 help determine the earth-oriented position. Due to forces exerted on the streamers due to water current vectors and streamer steering devices 10, positions of seismic receivers may not always be where the survey designers intend them to be. Furthermore, even full streamer length acoustic nets will not always function to determine position of streamers 6 and 8 accurately. Also, the further away from satellite receivers the acoustic positioning devices are in a particular net, the more any initial positioning uncertainty will grow.

Figure 2:
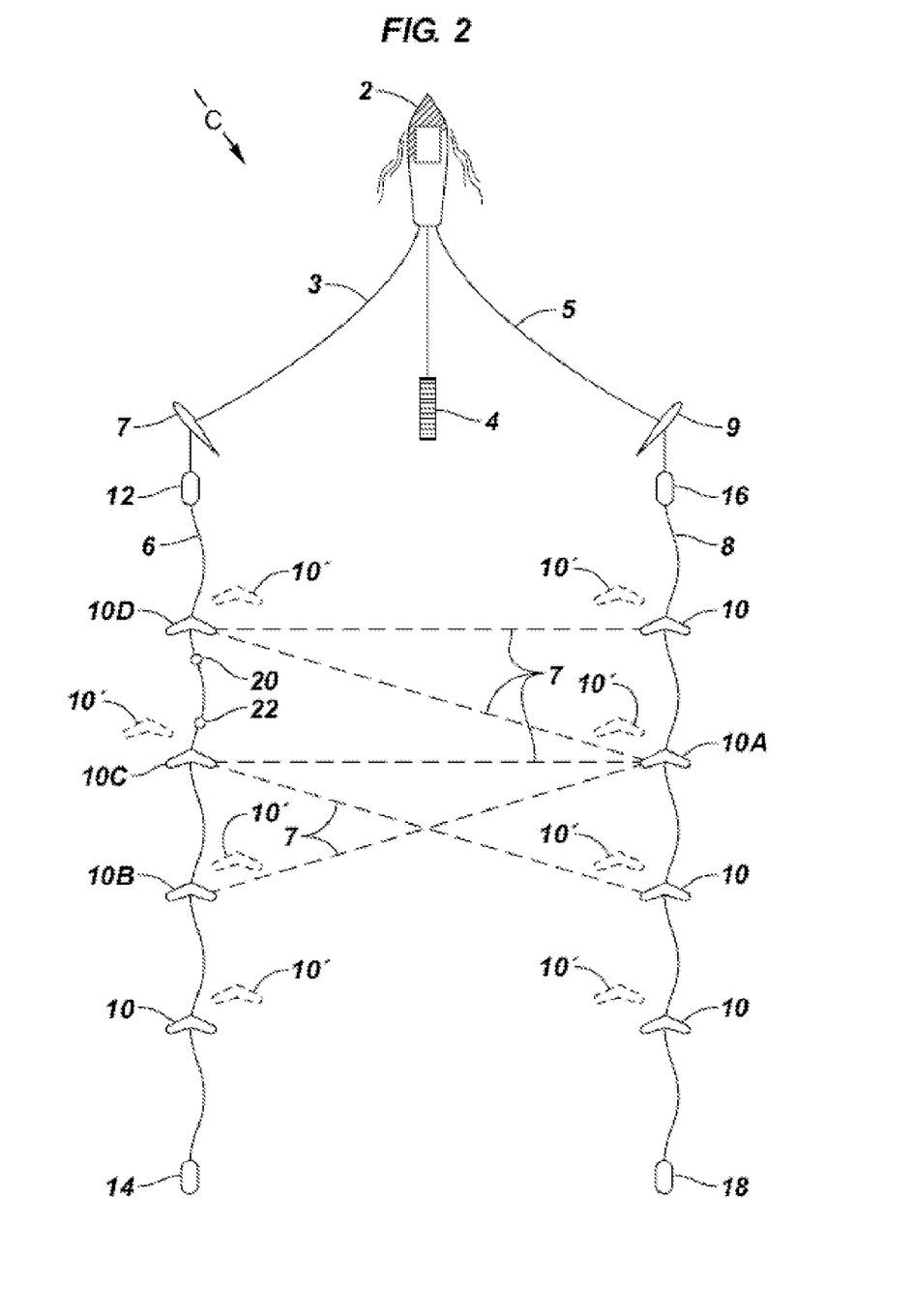
FIG. 2 illustrates the spread of FIG. 1 as well as possible target positions for several streamer steering devices, and modulated underwater acoustic transmissions used to calculate forces.

As depicted schematically in FIG. 1, a current indicated by arrow C tries to force streamers off the path intended by the survey operators, and numerous streamer steering devices 10 are used to keep the streamers close to the intended path. However, as illustrated in FIG. 1, which is exaggerated, the steamer then assumes a shape that is bowed between steering members 10. FIG. 2 illustrates the spread of FIG. 1 as well as possible target positions for several streamer steering devices, and modulated underwater acoustic transmissions used to calculate forces to reach the target positions indicated by phantom steerable birds 10'. As illustrated in FIG. 2, the present invention relates to various methods and systems for steering streamer steering devices, such as steerable, winged birds, to target positions, using modulated underwater acoustic signals, represented by dashed lines 7. Therefore, movements of individual streamer steering devices may be coordinated with movements of other streamer steering devices in their neighborhood to accomplish survey objectives. For example, streamer steering device 10A may coordinate its movements with those of streamer steering devices 10B, 10C, and 10D to achieve their target positions. The information conveyed via modulated underwater acoustic signals between streamer steering devices may be combined with information conveyed via wire through the streamers themselves, or via some other non-acoustic wireless transmissions. This information, as well as streamer physical properties may be used in the equations of motion to estimate positions of the streamer sections between steering devices. This may be accomplished by measuring the forces exerted by the wings, the tension in the streamer, the angle of incidence of the streamer to the flow direction, and the streamer relative water speed, and combining this information with the streamer diameter in the equations of motion. Methods of the invention may thus provide estimates of the positions of portions of the streamers, including seismic receivers and other sensors, along the cable with adequate precision for seismic image processing and provide a reasonable relation between adjacent streamers as to allow streamer steering. The methods of the invention apply to any type of lateral steering device attached to or inline of a cable and exerting a lateral force at a point along the cable.

Horizontal and vertical control of streamers is typically provided today by orientation members, which may be of any type as explained herein, such as small hydrofoils or steerable birds that can provide forces in the vertical and horizontal planes. Orientation members may be equally spaced along the length of the streamers, and may be clamped to streamers, hung from streamers, or inserted inline in streamers to provide the desired vertical and horizontal position control. Additional orientation members may be placed at intervals between main orientation members for supplemental position control, for example to reduce streamer "sagging" between locations where main orientation members are located on streamers. In some embodiments of the invention it may be possible to change the streamer configuration during the seismic survey using orientation members, optionally assisted by a winching system or other arrangement to alter the length of cables. Towed streamer systems may become unstable due to geometry of the streamers, the point of application of, and direction of the applied forces, unpredicted/unexpected currents, and the like. This may cause steerable birds to generate undesirable forces on a streamer and cause seismic receiver positions, and positions of other sensors, to vary from where they were planned to be positioned by the survey team.

Figure 3:
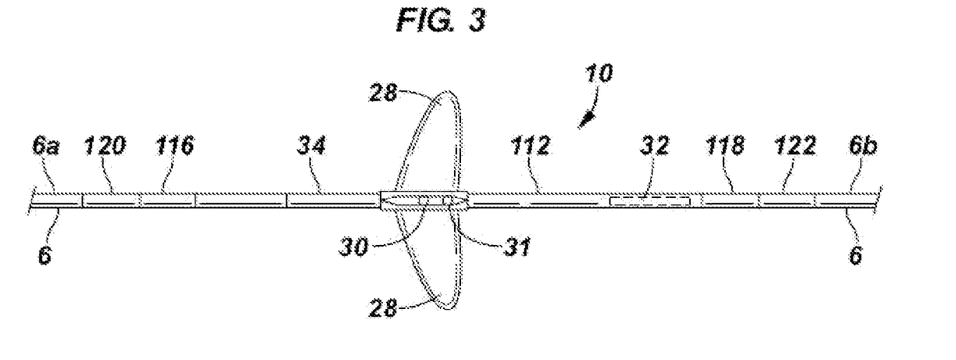
FIG. 3 is a schematic side elevation view of a prior art inline streamer steering device useful in the invention modified with instrumentation for sending and receiving modulated underwater acoustic signals.

One type of orientation member which may be used in accordance with the invention is described in commonly assigned U.S. Pat. No. 6,671,223, describing a steerable bird known under the trade designation "Q-FIN", available from WesternGeco LLC, Houston, Tex., that is designed to be electrically and mechanically connected in series (i.e., in line) with a streamer. Steering may be achieved through lift afforded by two independent wings or fins that rotate around an axis perpendicular to the wing axis controller body. A further description can be found in reference to FIG. 3. The streamer control device, or "steerable bird", of FIG. 3 is indicated generally at 10, and comprises an elongate streamlined body 112 adapted to be mechanically and electrically connected in series in a multi-section marine seismic streamer 6 of the kind which is towed by a seismic survey vessel and which is used, in conjunction with a seismic source which may also be towed by the vessel, to conduct marine seismic surveys, as briefly described hereinbefore. To permit such connection, each end of the body 112 is provided with a respective mechanical and electrical connector 116, 118, these connectors being complementary to, and designed to interconnect with, streamer end connectors 120, 122 respectively which are normally used to join together adjacent sections 6a and 6b of streamer 6. Bird 10 is provided with two opposed control surfaces, or wings, 28, typically molded from a fiber-reinforced plastics material, which project horizontally outwardly from the body 12 and which are independently rotatable about a common axis extending substantially perpendicularly through the longitudinal axis of the body.

Rotation of the wings 28 is affected under the control of a control system 32 (see also FIG. 4) sealingly housed within body 112. Wings 28 are generally ogival (i.e., rounded) and swept back with respect to the direction of tow of the streamer 6, in order to reduce the possibility of debris becoming hooked on them. To facilitate their rapid removal and reattachment, wings 28 are secured to body 112 by a quick-release attachment 30. As mentioned hereinbefore, streamer 6 includes hydrophones distributed along its length; it also includes control and conversion circuitry for converting the outputs of the hydrophones into digital data signals, longitudinally extending control and data lines for conducting control and data signals to and from the control and conversion circuitry, and electrical power supply lines for supplying electrical power from the vessel to the circuitry. All these lines are coupled together from streamer section 6a to streamer section 6b via respective corresponding lines 34 which extend through body 112 of bird 10 between the connectors 116, 118. Also depicted schematically in FIG. 3 is instrumentation 31 for generating an amplified modulated underwater acoustic signal that may be demodulated by instruments on other streamer steering devices to allow calculation of forces, as described herein, to move the streamer steering devices to target positions.

Figure 3A:
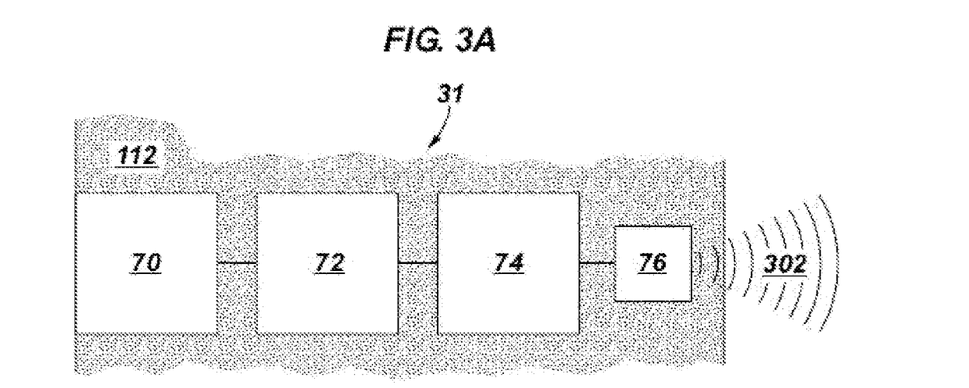
FIG. 3A is a schematic block diagram of one version of instrumentation that may be used to send modulated underwater acoustic signals from one streamer steering device to another streamer steering device.

Although each streamer steering device will generate its own natural underwater acoustic signature and corresponding signal that could be received by instruments on other streamer steering devices, FIG. 3A illustrates in schematic block diagram one version of instrumentation 31 that might be employed to generate an amplified modulated underwater acoustic signal. Instrumentation 31, which may be attached directly to body 112 of a steerable bird or other orientation member, may comprise an amplifier 70, connected electronically to one or more band pass filters 72, a voltage-controlled oscillator 74, and a ceramic transducer 76 which emits an amplified, filtered, modulated underwater acoustic signal 302, which may be received by a calculation unit or controller 33, as more fully explained herein with reference to FIG. 4.

Figure 4:
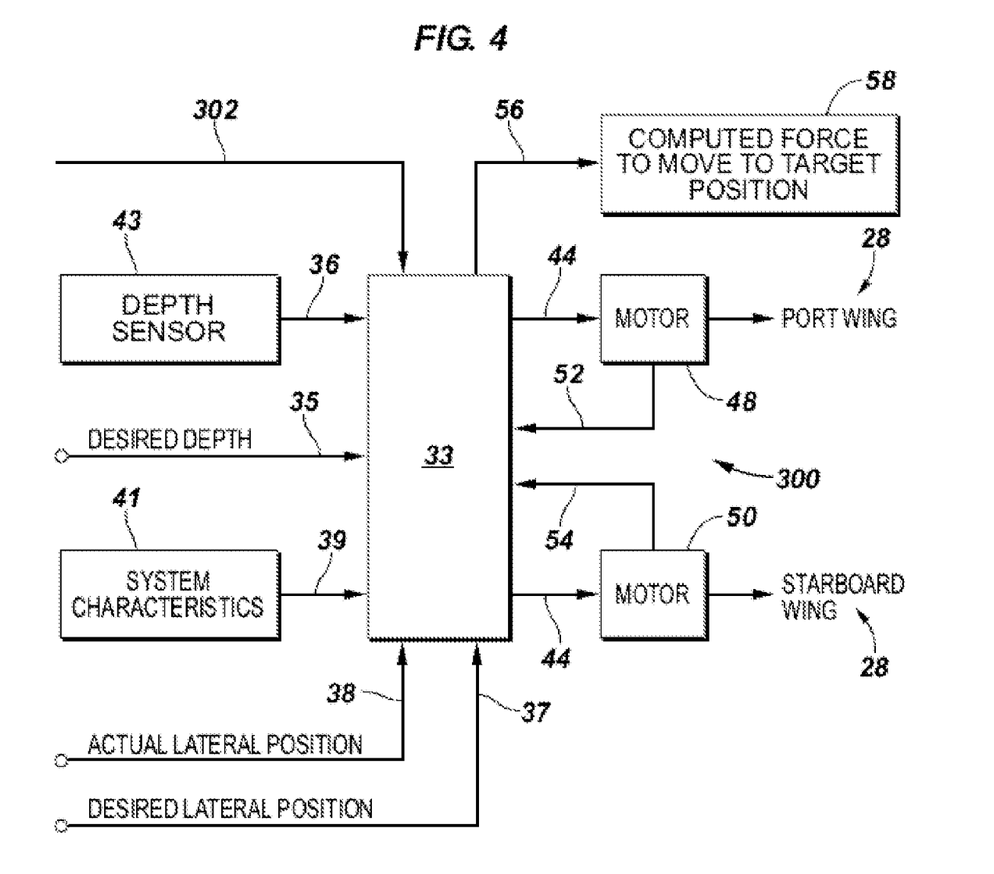
FIG. 4 is a schematic illustration of a control system useful in implementing methods and systems of the invention.

In operation, the control circuit receives between two inputs a signal indicative of the difference between the actual and desired depths of a bird, and receives between other inputs a signal indicative of the difference between the actual and desired lateral positions of a bird, as well as one or more modulated underwater acoustic signals from other streamer steering devices indicating their locations. These signals are used by the control circuit to calculate the roll angle of the bird and the respective angular positions of the wings which together will produce the necessary combination of vertical force (upwardly or downwardly) and lateral force (left or right) required to move the bird to the desired depth and lateral position (target position). The control circuit then adjusts each of the wings independently by means of the stepper motors so as to start to achieve the calculated bird roll angle and wing angular positions. As illustrated in FIG. 4, control system 300 is connected to receive control signals for desired depth 35 and actual depth 36 through a depth sensor 40, desired lateral position 37 actual lateral position 38, system characteristics 41, 39, such as steerable bird wing angles and wing areas, current vector information, streamer diameter and material of construction, GPS coordinates of one or more buoys and nearby receivers, and the like, and electric power from respective ones of the lines 34. Modulated underwater acoustic signals 302 from other streamer steering devices are also received and used in calculating forces necessary for a steerable bird or other orientation member to approach a target position. The modulated underwater acoustic signals may be demodulated by a calculation unit 33 having a demodulator, or by a separate demodulator. Calculation unit 33 then computes adjustments 44 for motors 48 and 50 driving wings 28, and outputs 56 computed force required to move the streamer steering device to a target position, 58. The position of wings 28 may also reported back to calculation unit 33 as indicated at 52 and 54. Calculation unit 33 may include software and hardware allowing the implementation of one or more equations of motion, as well as other algorithms and operations as required, as well as data warehouses and the like.

Referring again to FIG. 3A, instrumentation and circuitry necessary to acquire the orientation member signal, amplify and filter it, and then encode the waveform as a modulated underwater acoustic signal may vary, and the modulation may be frequency-modulation, amplitude-modulation, and other modulations. In some embodiments, frequency-modulated (FM) acoustic signal for transmission through sea water may be used. The orientation member signal may be obtained using bipolar electrodes (not illustrated), for example small diameter Teflon-coated stainless-steel wires bared 1 mm from their tips. The signal may be amplified for example 10 to 10,000 times by a differential amplifier 70. Post-amplification, the signal may be passed through a band-pass filter 72 with the low-pass and high-pass poles set for example at 500 Hz and 1 Hz, respectively. The output of the filter may be connected to a voltage-controlled oscillator (VCO) 74. The incoming voltage from the orientation member dictates the VCO oscillation frequency producing a modulated signal. The output of the VCO may be connected to an acoustic transducer 76 that transmits the modulated signal. The transducer may be for example a 0.95 cm diameter, 0.95 cm long PZT-4 ceramic tube with a hoop-mode resonance frequency of 122 kHz (EDO, Salt Lake City, Utah, USA). The instrumentation dimensions may vary but may be quite small. As an example the dimensions may be 4 cm×2.5 cm×1 cm. Power may be provided by small batteries, or through wires through the streamers, or both. Suitable batteries might be two 3V lithium, coin-cell batteries (Panasonic, BR 2032), providing a 40 h lifetime. A direct connection may be made to the band-pass filter output to compare the electrical signal measured from the orientation member and the acoustically transmitted signal. The entire instrument may be cast in plastic resin such as epoxy, and attached to body 112 using any suitable attachment means, such as an adhesive, hook and loop fasteners, screws, rivets, or combinations thereof.

A receiver may be provided to decode the received acoustic waveforms, converting the modulated signal back into voltage. Measurement of the acoustic signal frequency may be continuous or discontinuous. If frequency-modulation is used, frequency detection may be complicated by multipath. The signal emitted from a transducer has a broad beam-width and there are multiple paths the acoustic signal can follow between the transducer and hydrophone, including a direct path as well as paths that may reflect one or more times off of objects or the water surface. Constructive or destructive interference between these paths may cause the received signal to fade in and out as the transmitted frequency changes. This fading, along with the variable time delay between the paths, can complicate detection of the transmitted frequency. Different receiver types may help alleviate multipath. For example, one or two hydrophones equipped with the same transducer may be used as are used in the transmitter. One receiver might be used to digitize and store the unprocessed acoustic signal. The digitized acoustic signal may then be later processed to recover the waveform. The average period of the acoustic signal may be measured over blocks of cycles, for example over 128 or 512 cycles, taking the inverse of the period to yield the frequency and converting the frequency back into voltage based on calibration curves for the VCO. Other receivers may allow immediate observation of the received voltage. Receivers may apply the same or different decoding algorithms, and decoding may be accomplished primarily in software, hardware, or any combination thereof. The output may be in digital form and sent to a desktop or laptop computer. The computer may be used to convert the timing results into the waveform, which may then be displayed. While software limitations may limit the maximum sampling frequency, the methods and systems of the invention are not so limited. Receivers may compare the signal strength from two hydrophones at different locations and rapidly switch between them, selecting at each time the hydrophone with the higher amplitude signal. Other receivers may use only one hydrophone and may be assembled from commercially available equipment. Suitable band-pass filters, such as that known under the trade designation AP280-5-SR, from AP Circuit Corp., may be used, and then demodulated by an FM receiver (for example that known by the trade designation TS440 from Kenwood) which may employ a phase-locked loop for frequency measurement. The phase-locked loop may have an internal VCO similar to the VCO of the signaling instrumentation. The phase-locked loop may apply a varying control voltage to its own VCO in a feedback loop such that its frequency tracks the frequency of the received signal. In the absence of multipath, the control voltage recreates the orientation member's signal voltage. The control voltage output may then be low-pass filtered using any suitable low pass filter, and the output connected to a speaker to provide an audible indication of orientation member movement, if desired. The waveform may also be recorded to a tape recorder, such as that known under the trade designation XR 7000 from TEAC, and later digitized.

The received signal strength in sea water is dependent on the signal instrumentation's power output, transmission frequency and signal type (e.g. acoustic, electromagnetic). Acoustic signals from 22 to 60 kHz are commonly used for telemetry in the marine environment. Lower transmission distances result in relatively lower power requirements and may enable the use of higher frequency acoustic transmission frequency. Assuming all electrical signals are matched by a corresponding acoustic signal, the results should demonstrate that the orientation member signal waveform may be replicated with the accuracy required for complex quantitative analysis. Although the number and intensity of peaks may differ slightly between the direct and acoustic signals, the onset, offset duration, number of zero crossings, area under the rectified waveform, and the product of the peak and mean peak intensity should be the same or very similar. Linear FM regimes, if used to transmit the signal, are simple to implement in hardware and more robust to multipath interference than many other modulation schemes, such as amplitude modulation.

The complete process of transmitting a modulated underwater acoustic signal requires a receiver that can detect and decode the acoustic signal frequency to reconstruct the waveform. A variety of variables will influence the quality of the acoustic transmission. These include the size and shape of the seismic spread, the composition of the streamers and streamer steering devices, the transmitter and receiver locations and motion, and the receiver design. The relative importance of these variables requires further work, including studies over an extended spatial and temporal scale will be possible, expanding the scope of variables that may be examined.

Referring again to FIGS. 3 and 4, in cases where a streamer is slightly heavy (slightly negative buoyancy), and the steerable bird thus needs to produce lift to maintain its target depth, this lift may be produced by the flow of the water over the wings of the bird, resulting from the towing speed of the streamer through the water, and can be changed by changing the angle of attack of the wings with respect to the flow. The magnitude of the lift required depends on how far the steerable bird is off of target depth and/or lateral position. If the steerable bird needs to be moved laterally to achieve a target position, the angular position of one wing of the steerable bird may first be adjusted to increase its lift, while the angular position of the other wing is adjusted to decrease its lift, thus causing the steerable bird to roll clockwise or counterclockwise as desired. This roll continues until the steerable bird reaches a steady state condition, where the vertical component of the lift produced by the wings is equal to the lift required to maintain the steerable bird at the desired depth, while the much larger horizontal component moves the steerable bird laterally as desired.

While adjusting the angular positions of the wings of the controllable bird, the control circuit may continuously receive modulated underwater acoustic signals representative of spatial relation of other steerable birds, signals representative of the actual angular positions of the wings from the stepper motors, as well as a signal representative of the actual roll angle of the bird from an inclinometer, to enable it to determine when the calculated wing angular positions and bird roll angle have been reached to move the steerable bird to the target position. And as the aforementioned difference signals reduce, the control circuit repeatedly recalculates the progressively changing values of the roll angle of the bird and the angular positions of the wings required for the steerable bird to reach the desired depth and lateral position, until the steerable bird actually reaches the desired target position.

The body of the steerable bird may or may not rotate with respect to the streamer; if it does not rotate with respect to the streamer, it will twist the streamer as it rolls. The streamer will resist this twisting motion, so acting as a kind of torsion spring which tends to return the bird to its normal position (i.e. with the wings extending horizontally). However, this spring returning action, though beneficial, is not essential, and the steerable bird may if desired be designed to rotate to a certain extent with respect to the axis of the streamer.

Once the spatial relation of steerable birds or other type orientation members have been measured and the forces calculated to urge the orientation members toward their respective target positions, force models of the streamers may provide receiver position estimates. The direction and speed of the water flow past a streamer, (i.e., current relative to the streamer, and to wings of steering devices) may be determined within a common absolute reference frame, such as the World Geodetic System-1984 (WGS-84). For example, the combined vectors for ocean current and vessel motion give the water flow vector. Estimates of varying precision and accuracy for the streamer orientation exist. The streamer orientation uncertainty is due to at least two model errors; the streamer shape model between the steering devices and the unmodeled misalignment of the steering device relative to the longitudinal streamer axis.

Several methods can be used to advantage to calculate forces on a streamer in the absence of this information. The least precise is to assume the angle of attack of a streamer does not change and use a reasonable value and accept the accompanying error. An improvement on this method is to assume that the streamer is straight. A refinement again is to accept that the streamer is not straight and to use a function that approximates the streamer shape. These methods provide a more precise orientation estimate for the streamer than simply assuming the streamer is straight, however they are still estimates. Rather than using a streamer shape model, the best way to determine forces on a streamer is by measuring one or more characteristics of the steering devices and use this information to calculate the forces the steering devices are actually exerting on the streamer or portions thereof The actual forces may be calculated using the equations of motion.

Knowing the respective wing surface areas, wing shapes, and the water flow vector over the wings, one can calculate the forces actually exerted by the wings, and thus by the steering devices while trying to reach their calculated target positions. Tension in the streamer cable may be measured using suitable devices, and the diameter and materials of construction of the streamer are known. It is then possible to calculate the position of a portion of the streamer, such as a seismic receiver, at time t, relative to a known position of a receiver at time to using this information and the equations of motion. Examples of using the equations of motion relative to towed flexible cylinders was addressed by Dowling in at least two articles, which are incorporated by reference herein: Dowling, A. P., "The Dynamics of Towed Flexible Cylinders Part I. Neutrally Buoyant Elements", J. Fluid Mechanics, V. 187, pp 507-532 (1988); and Dowling, A. P., "The Dynamics of Towed Flexible Cylinders Part II. Negatively Buoyant Elements", J. Fluid Mechanics, V. 187, pp 533-571 (1988). Mathematical treatment of wings, including spanning area and lift and drag coefficients, was address by Tritton in 1988: Tritton, D. J., "Physical Fluid Dynamics", Second Ed., Chapter 3, pp 153-161, Oxford Science Publications (1988), which is also incorporated by reference herein.

The initial lateral position of one or more steerable birds in a marine seismic spread that is close to a GPS receiver in the spread may be determined for instance by using GPS alone or combined with an acoustic positioning system, such as a short-baseline (SBL) or ultra-short baseline (USBL) acoustic system. By further using measured characteristics of steering devices, transmitting modulated underwater acoustic signals, and calculating the forces exerted on the streamer or portions thereof by the steering devices, it is possible to calculate the position of a portion of the streamer, such as an acoustic receiver, at times $t_1, t_2, \ldots, t_n$, at least relative to a known position. All receivers in or on a streamer cable, including receivers on birds, and other sensors and portions of a streamer, can this way be tracked for the purpose of deployment precision, increased operational safety, and increased efficiency.

It is within the invention to combine systems of the invention with other position control equipment, such as source array deflecting members, and streamer deflectors. Some of these may include bridle systems, pneumatic systems, hydraulic systems, and combinations thereof.

Materials of construction of orientation members and streamers useful in systems and methods of the invention may vary. However, there may be a need to balance the seismic equipment so that the system is balanced to be neutrally buoyant in the water, or nearly so, to perform its intended function. Polymeric composites, with appropriate fillers used to adjust buoyancy and mechanical properties as desired, may be employed.

In certain embodiments, regardless of the acoustic environment, a higher density of global positioning control points throughout the spread will improve overall accuracy by decreasing the distance between these points and the associated degradation of accuracy.

Other steerable birds useful in the invention include battery-powered steerable birds suspended beneath the streamer and including a pair of laterally projecting wings, the combination of streamers, orientation members (steerable birds) being arranged to be neutrally buoyant. Clamp-on steerable birds, as discussed previously, may also be employed. Steerable birds useful in the invention, including suspended birds, in-line birds, and clamp-on birds may include on-board controllers and/or communications devices, which may be microprocessor-based, to receive control signals representative of desired depth, actual depth, desired lateral position, actual lateral position and roll angle of the steerable bird. The bird on-board controllers may communicate with local controllers mounted on or in other birds, and/or communicate with other local controllers and/or remote controllers, such as a supervisory controller.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A method for steering one or more streamers of a marine seismic spread comprising:

(a) receiving one or more modulated underwater acoustic signals from one or more acoustic transducers coupled to one or more streamer steering devices, wherein the modulated underwater acoustic signals comprise spatial relationship data and characteristics of the streamer steering devices;

(b) demodulating at least some of the modulated underwater acoustic signals from other streamer steering devices;

(c) receiving survey information signals through the streamers; and (d) calculating one or more forces to coordinate movements of the streamer steering devices to one or more target positions using the demodulated underwater acoustic signals in combination with the survey information signals.

2. The method of claim 1 wherein at least some of the streamer steering devices are steerable birds having wings.

3. The method of claim 2 wherein the modulated underwater acoustic signals further comprise information selected from coordinates of one or more other streamer steering devices, coordinates of a center of a seismic source, water physical properties, water fluid properties, base survey receiver positions, collision avoidance coordinates, angle of wings to a reference, stepper motor settings, controller set points, tension in the streamer, angle of incidence of the streamer to flow direction, streamer relative water speed, streamer diameter, streamer density and any combination of two or more thereof.

4. The method of claim 3 wherein the water physical properties are selected from temperature, salinity, conductivity, resistivity, density, specific gravity, and the like.

5. The method of claim 3 wherein the water fluid properties are selected from water current vector at a towing vessel, current vector at the streamer steering devices, and historical current vectors.

6. The method of claim 1 wherein the target positions are determined in conjunction with non-acoustic wireless transmissions.

7. The method of claim 1 wherein the target positions are dictated by optimizing shape of the spread to fit a survey objective(s) selected from straight with a desired feather angle, local feather angles defined by segments along the streamer to achieve a best fit for a prior streamer survey shape, and evenly spaced streamers to allow better trace interpolation during seismic data processing.

8. The method of claim 1 wherein the target positions are calculated with varying resolution.

9. The method of claim 1 wherein at least one of the target positions is a coordinate occupied by a steering device in a previous survey.

10. The method of claim 1 wherein at least one of the target positions is based on moving a portion of the streamers to a location that provides a particular offset, azimuth, or both an offset and azimuth related to a seismic source.

11. The method of claim 1 comprising validating at least some of the target positions.

12. The method of claim 1 comprising sensing earth-based position of points on the seismic streamer through use of satellite receivers spaced as desired in the marine seismic spread, which may be regularly or randomly spaced.

13. The method of claim 1 comprising sensing positions of the streamer steering devices using a plurality of global positioning receivers placed on or in the spread in locations able to receive satellite signals.

14. The method of claim 1, wherein the characteristics comprise one or more actual angular positions of one or more wings from one or more stepper motors of at least some of the streamer steering devices.

15. The method of claim 1 wherein the spatial relationship data comprise one or more distances between the streamer steering devices.

16. The method of claim 1 wherein the spatial relationship data is determined using transmitted and received modulated underwater acoustic signals between the streamer steering devices.

17. The method of claim 1, wherein the characteristics comprise one or more roll angles of one or more birds from an inclinometer of the at least some of the streamer steering devices.

18. A method for steering a plurality of steerable birds attached to one or more marine seismic streamers of a marine seismic spread comprising:

(a) receiving one or more modulated underwater acoustic signals from one or more acoustic transducers couple to the plurality of steerable birds, wherein the modulated underwater acoustic signals comprise spatial relationship data and characteristics of the plurality of steerable birds;

(b) demodulating at least some of the modulated underwater acoustic signals from other steerable birds;

(c) receiving survey information signals through the streamers; and (d) calculating one or more forces to coordinate movements of the plurality of steerable birds to one or more target positions using the demodulated underwater acoustic signals in combination with the survey information signals.

19. The method of claim 18 wherein at least one of the target positions is a coordinate occupied by a steering device in a previous survey.

20. The method of claim 18 wherein at least one of the target positions is based on moving a portion of the streamer to a location that provides a particular offset, azimuth, or both an offset and azimuth related to a seismic source.

* * * * *